United States Patent
Gaeta et al.

(10) Patent No.: US 11,625,556 B1
(45) Date of Patent: Apr. 11, 2023

(54) CUSTOMER SERVICE LEARNING MACHINE

(71) Applicant: United Services Automobile Association (USAA), San Antonio, TX (US)

(72) Inventors: Michael Joseph Gaeta, San Antonio, TX (US); Christina N. Nickel, Boerne, TX (US); Shane Steinert, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 247 days.

(21) Appl. No.: 17/096,659

(22) Filed: Nov. 12, 2020

Related U.S. Application Data

(63) Continuation of application No. 15/998,991, filed on Aug. 20, 2018, now Pat. No. 10,909,422.

(60) Provisional application No. 62/548,662, filed on Aug. 22, 2017.

(51) Int. Cl.
| | |
|---|---|
| *G06Q 30/00* | (2012.01) |
| *G06K 9/62* | (2022.01) |
| *H04M 3/22* | (2006.01) |
| *G06N 20/00* | (2019.01) |
| *H04L 67/50* | (2022.01) |

(52) U.S. Cl.
CPC ........... *G06K 9/6257* (2013.01); *G06N 20/00* (2019.01); *H04L 67/535* (2022.05); *H04M 3/2227* (2013.01)

(58) Field of Classification Search
CPC ........ G06Q 30/016; G06Q 30/00; G06K 9/62; G06N 20/00; H04M 3/22; H04L 29/08
USPC .............................................. 705/304; 706/21
See application file for complete search history.

(56) References Cited

U.S. PATENT DOCUMENTS

| | | | |
|---|---|---|---|
| 6,724,887 B1 | 4/2004 | Eilbacher et al. | |
| 7,995,740 B2 | 8/2011 | Busey et al. | |
| 8,010,402 B1 | 8/2011 | Sharma et al. | |
| 8,219,438 B1* | 7/2012 | Moon .................... | G06V 20/52 |
| | | | 705/7.29 |
| 9,060,062 B1 | 6/2015 | Madhar et al. | |
| 9,305,268 B2 | 4/2016 | Wu et al. | |
| 9,473,639 B2 | 10/2016 | McCormack et al. | |
| 9,483,742 B1 | 11/2016 | Ahmed | |
| 9,742,916 B1 | 8/2017 | Christopher | |
| 9,760,913 B1* | 9/2017 | Allen ...................... | G06F 9/453 |
| 9,846,999 B1 | 12/2017 | Pickover et al. | |
| 9,894,206 B2 | 2/2018 | Skiba et al. | |
| 10,044,861 B2 | 8/2018 | Watson et al. | |
| 10,147,438 B2 | 9/2018 | Church et al. | |
| 10,303,978 B1 | 5/2019 | Kang et al. | |
| 10,397,236 B1 | 8/2019 | Chadha et al. | |

(Continued)

OTHER PUBLICATIONS

He et al., "Deep Reinforcement Learning with a Natural Language Action Space" arXiv preprint arXiv: 1511.04636, Nov. 2015, 1-15.

*Primary Examiner* — Andrew Joseph Rudy
(74) *Attorney, Agent, or Firm* — Fish & Richardson P.C.

(57) ABSTRACT

Techniques are described for training a learning machine. One of these methods includes tracking interactions between a customer and customer service agents. The method includes generating a training set based on the tracked interactions. The method also includes generating a trained learning machine comprising training a learning machine using the training set.

20 Claims, 5 Drawing Sheets

(56) References Cited

U.S. PATENT DOCUMENTS

| | | | |
|---|---|---|---|
| 10,438,157 | B2 | 10/2019 | Heier |
| 10,552,743 | B2 | 2/2020 | Sneyders et al. |
| 10,572,360 | B2 | 2/2020 | Chorley et al. |
| 10,586,237 | B2 | 3/2020 | Coughlin et al. |
| 10,594,757 | B1 * | 3/2020 | Shevchenko ............ G06F 40/35 |
| 10,614,793 | B2 | 4/2020 | Zoller et al. |
| 10,657,718 | B1 * | 5/2020 | Miranda ................ G06T 19/006 |
| 10,678,830 | B2 | 6/2020 | Chuanlu et al. |
| 10,748,001 | B2 | 8/2020 | Abishek et al. |
| 10,909,422 | B1 * | 2/2021 | Gaeta ..................... G06N 3/088 |
| 2016/0210503 | A1 * | 7/2016 | Yin .......................... G06T 7/73 |
| 2017/0357847 | A1 | 12/2017 | Jabri |
| 2021/0401338 | A1 * | 12/2021 | Flickinger .......... A61B 5/02055 |

\* cited by examiner

CUSTOMER SERVICE LEARNING MACHINE

CROSS-REFERENCE TO RELATED APPLICATION

This application is a continuation application of and claims priority under 35 U.S.C. § 120 to U.S. application Ser. No. 15/998,991, filed on Aug. 20, 2018, which claims priority to U.S. Application Ser. No. 62/548,662, filed on Aug. 22, 2017, the entire contents of each of which are incorporated herein by reference.

BACKGROUND

Machine learning is the subfield of computer science that attempts to give computers the ability to learn without being explicitly programmed. Machine learning explores the study and construction of algorithms that can learn from and make predictions on data by building a model from sample inputs. Machine learning is employed in a range of computing tasks where designing and programming explicit algorithms with good performance is difficult or infeasible.

SUMMARY

Implementations of the present disclosure are generally directed to training a learning machine.

In general, innovative aspects of the subject matter described in this specification can be embodied in methods that includes action of tracking interactions between a customer and customer service agents. The method includes the action of generating a training set based on the tracked interactions. The method also includes in action of generating a trained learning machine comprising training a learning machine using the training set.

Implementations can optionally include one or more of the following features. The methods may include the act of establishing an interaction between a second customer and the trained learning machine. Training the learning machine may include using a reinforcement learning algorithm to train the machine. Some samples in the training set may include quantitative indicia of quality. Some samples in the training set may not include a quantitative indicia of quality. Training the learning machine may include training the learning machine to achieve a goal state.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
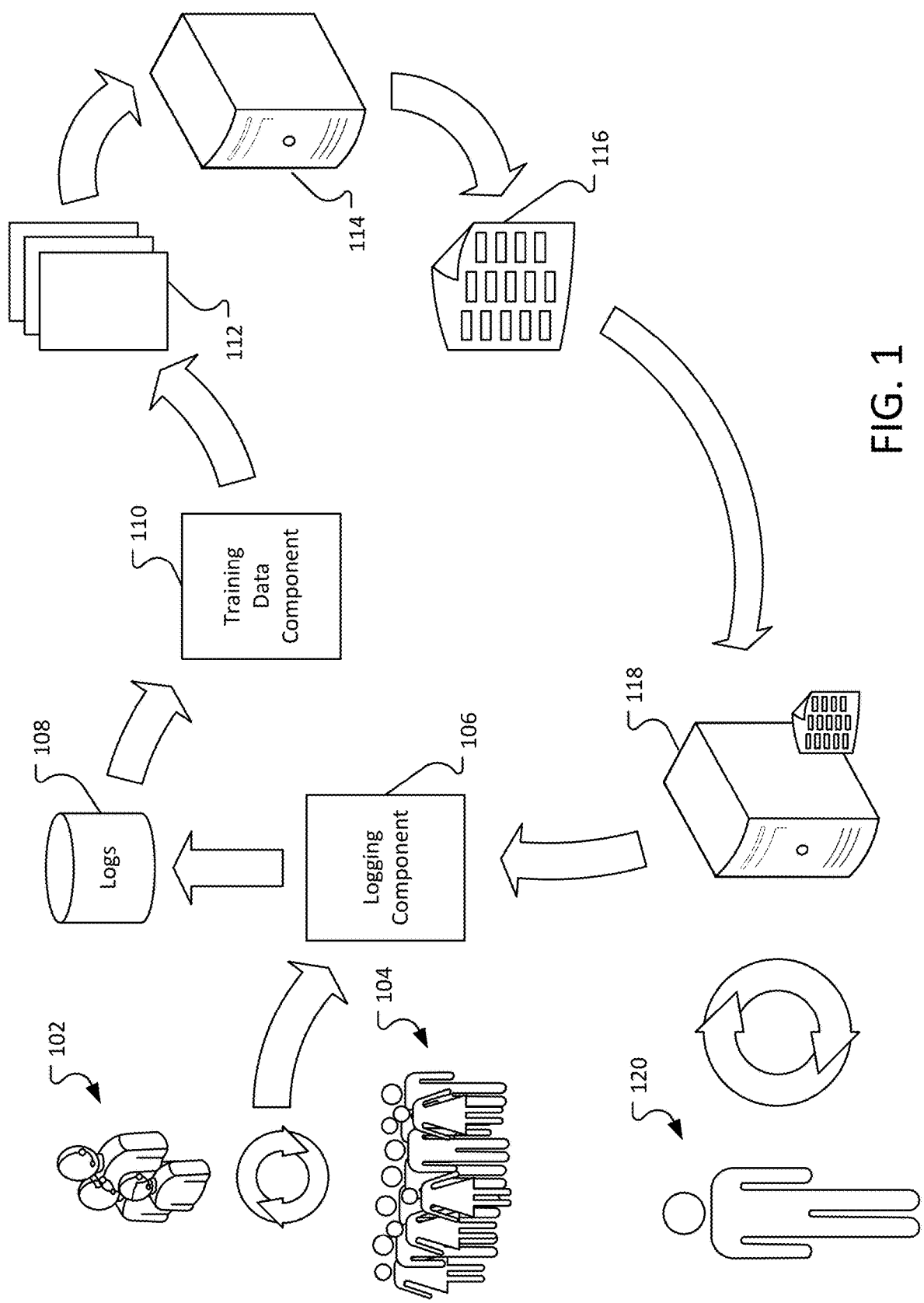
FIG. 1 depicts an example system for determining metric (s) for service session(s), according to implementations of the present disclosure.

In general, machine learning refers to a type of artificial intelligence (AI) that provides computers with the ability to deduce information without being explicitly programmed to make the particular deductions. A learning machine uses underlying algorithms to develop a model from examples (samples) (referred to as training sets) of input observations in order to make data-driven predictions or decisions expressed as outputs, rather than following strictly static program instructions. Generally, the software uses statistical analysis techniques to predict an output value within an acceptable range of possible values. Learning machines can rely on different techniques to develop a model, including supervised learning, reinforcement learning, and unsupervised learning. In supervised learning, the training set includes a set of input data that is labeled to provide information about the data. For example, a particular sample in a training set may be labeled as a good example, or may be labeled as a bad example. In some implementations, samples in the training set may be labeled using a numeric scale or a grade in order to provide further gradients that describe how good or bad a particular sample is. Reinforcement learning differs from supervised learning in that correct input/output pairs are not presented, nor are sub-optimal actions explicitly corrected. Instead there is a focus on on-line performance, which involves finding a balance between exploration (finding new solutions to existing problems) and exploitation (relying on previously successful interactions). In unsupervised learning the learning machine is used to draw inferences from the training sets without labeled responses.

The correct handling of customer service interactions is a complex endeavor. The customer service agent interacts with the customer and must determine both the needs of the customer and the best way to fulfill the needs of the particular customer. The best way may differ from customer to customer, and even may change for a given customer from day to day. For example, a customer service representative may or may not completely understand what the customer is requesting, the customer may be calm or irritable, the customer may be in a hurry or may wish to have details about the process explained, etc. Each of these, as well as other factors, can influence the best way to meet the customer's needs. A customer service representative may, consciously or unconsciously, adjust their behavior based on a multitude of different things that influence the course of the interaction. In some cases, the customer service representative may alter their behavior without knowing why they are doing so.

A learning machine may analyze the behavior of customer service representatives interacting with customers and build a model that can be used to interact with customer service respresentatives in the future.

The learning machine can be, for example, an artificial neural network (ANN) or connectionist system. ANNs take their name from biological neural networks found in animal brains. Thusly, an ANN is based on a collection of connected units called artificial neurons, (analogous to axons in a biological brain). Each connection (synapse) between (two) neurons can transmit an unidirectional signal with an activating strength that varies with the strength of the connection. If the combined incoming signals (from potentially many transmitting neurons) are strong enough, the receiving (postsynaptic) neuron activates and propagates a signal to downstream neurons connected to it.

One advantage of using an ANN that the ANN can infer a function from sufficient observations. This is particularly useful where the complexity of the data or task makes the design of such a function by hand impracticable.

One useful method of training a learning machine is reinforcement learning. Reinforcement learning is concerned with how software agents should act in an environment to maximize a cumulative reward. The main difference between the classical techniques and reinforcement learning algorithms is that the reinforcement learning does not require knowledge about the decision process. As such they are useful in problems where other methods become infeasible.

Reinforcement learning differs from standard supervised learning in that correct input/output pairs are generally not presented, nor sub-optimal actions explicitly corrected. Further, there is a focus on on-line performance, which involves finding a balance between exploration (trying new things) and exploitation (relying on previous knowledge). Pure exploration (that is, randomly selecting actions) is likely to produce many poor outcomes. In a customer services environment, such outcomes may not be acceptable. Therefore, it can be useful to train the learning machine, initially, with structured data and then later allow the system to explore using the structured data as a guide.

FIG. 1 illustrates a flow of training and using a learning machine for customer service interactions. Customer service representatives 102 interact with customers 104. Each interaction may consist of, for example, a telephone call, a chat session, a video conference, etc. A logging component 106 can monitor the interactions and generate a log (stored in a data store, represented by logs 108). The log can monitor both the communication between the customer service representatives and the customers as well as the actions taken by the customer service representative in response to those interactions.

A training data component 110 can receive or obtain the logs 108 and generate training data 112. In general, one interaction between a customer service representative and a customer may be stored as a training sample in the training data 112. Interactions can be defined at various levels of granularity. For example, the interaction can be described as a complete call between a customer and a customer service representative, from the time the customer initiates contact until the contact is completed, the interaction can be defined as communication between the customer and the customer service representative that results in the customer service representative taking an action on a computer, etc. In some implementations, training data may include samples of interactions at multiple different levels of granularity.

As described above, the training data 112 can be either supervised (that is, where the training data 112 includes an indication as to how good each training sample is) or unsupervised (where the training data 112 does not include an indication as to how good each training sample is. Training a model using supervised learning has the advantage of increasing the number of correct hits, however, the model frequently lacks information about why a particular combination of factors was successful, or which factors contributed to the success. Accordingly, the system tends to falter when facing unknown or unfamiliar situations. In contrast, training using unsupervised training can require additional data to train the model, but tends to behave more optimally in unfamiliar situations (as opposed to models trained using supervised training data).

In some implementations, the training data may include a combination of supervised and unsupervised training data. For example, a model may be initially trained using supervised training data, but the training may be refined using unsupervised training data.

The training data 112 can be provided to a learning machine 114. The learning machine 114 processes the training data 112 and generates a model 116. The model can be used by the learning machine 114 (or another learning machine 118) in order to handle interactions with customers (for example, the customer 112). In some implementations, the interaction between the customers and the learning machine 118 can be logged by the logging component 106 and used to refine the model.

Figure 2:
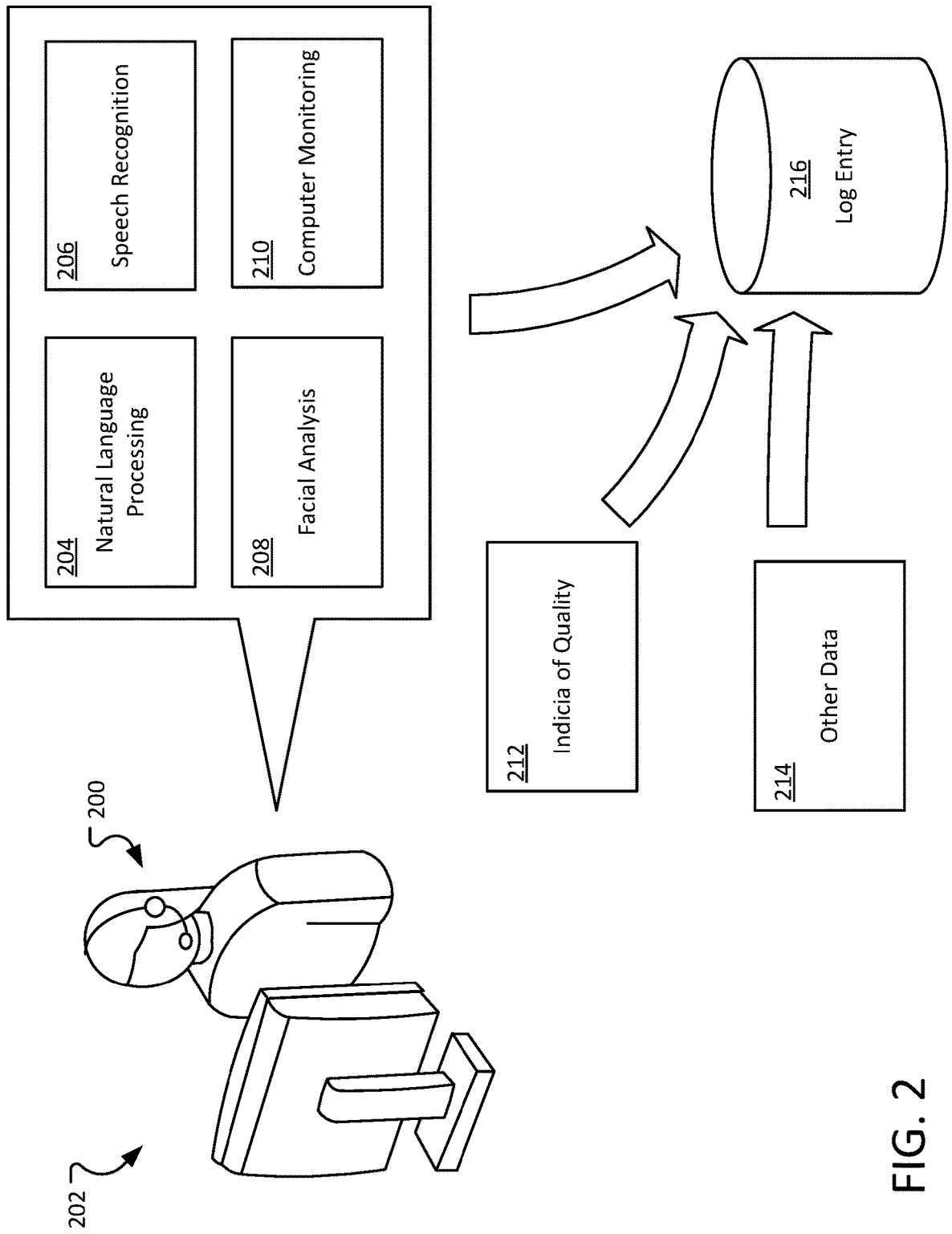
FIG. 2 depicts an example of training data used to provide model(s) for determining metric(s), according to implementations of the present disclosure.

FIG. 2 illustrates an example of the information that can be collected from a customer service representative. In this example, the customer service representative 200 is on a call with a customer and is operating a computer 202. The computer 202 (or some other intermediary computing device that can access the described information about the call) can track information about the interaction between the customer service representative and the customer as well as the actions taken by the customer service representative 200 on the computer 202. For example, the computer 202 may include a natural language processing component 204. In general, natural language processing is a way for computers to analyze and derive meaning from human language. The natural language processing component may, for example, analyze an electronic chat conversation between a customer and the customer service representative.

The computer system 202 may include a speech recognition component 206. In some implementations, the natural language processing component 204 can include or interact with the speech recognition component 206. In general, speech recognition refers to the ability for a computer to transcribe human speech into text. The speech recognition component 206 may also be able to perform auditory analysis on the conversation. For example, the speech recognition component 206 may be able to determine an emotional state of the customer and/or the customer service representative (for example, determining whether one of the parties is stressed, angry, calm, hostile, etc.)

In some implementations, the computer 202 can include a facial analysis component 208. The facial analysis component 208 may use a camera connected to the computer 202 to perform facial analysis on the customer service representative 200 during the interaction with the customer. The facial analysis component 208 may provide indications as to the emotional state of the customer service representative, for example, if the customer service representative appears calm, concerned, confused, worried, angry, etc.

The computer 202 can also include a computer monitoring component 210. The computer monitoring component 210 can track actions taken on the computer, for example, the computer monitoring component 210 can track mouse movements and clicks, application execution, key strokes, etc.

The computer 202 can provide the collected information to a log entry data store 216. Different types of data may include time information to allow for correct sequencing. This information may be combined indicia of quality 212. For example, an expert customer service representative may review the interactions and determine how well they represent the ideal goals of the company or organization, the customer may answer a survey and provide a quantitative evaluation of the interaction, etc. The indicia of quality 212 may also include information about whether or not the customer called back on the same topic, whether or not the call was escalated to another customer service representative (for example, a manager), etc.

The information may be combined with other data 214. For example, the data may be combined with information about the state of the economy, news information, weather information, etc.

This information may be provided to a training set component (for example, the training set component 110 of FIG. 1, and used to generate training sets, as described above.

While the example above has been described with respect to an artificial neural network other types of learning machines may be used.

Figure 3:
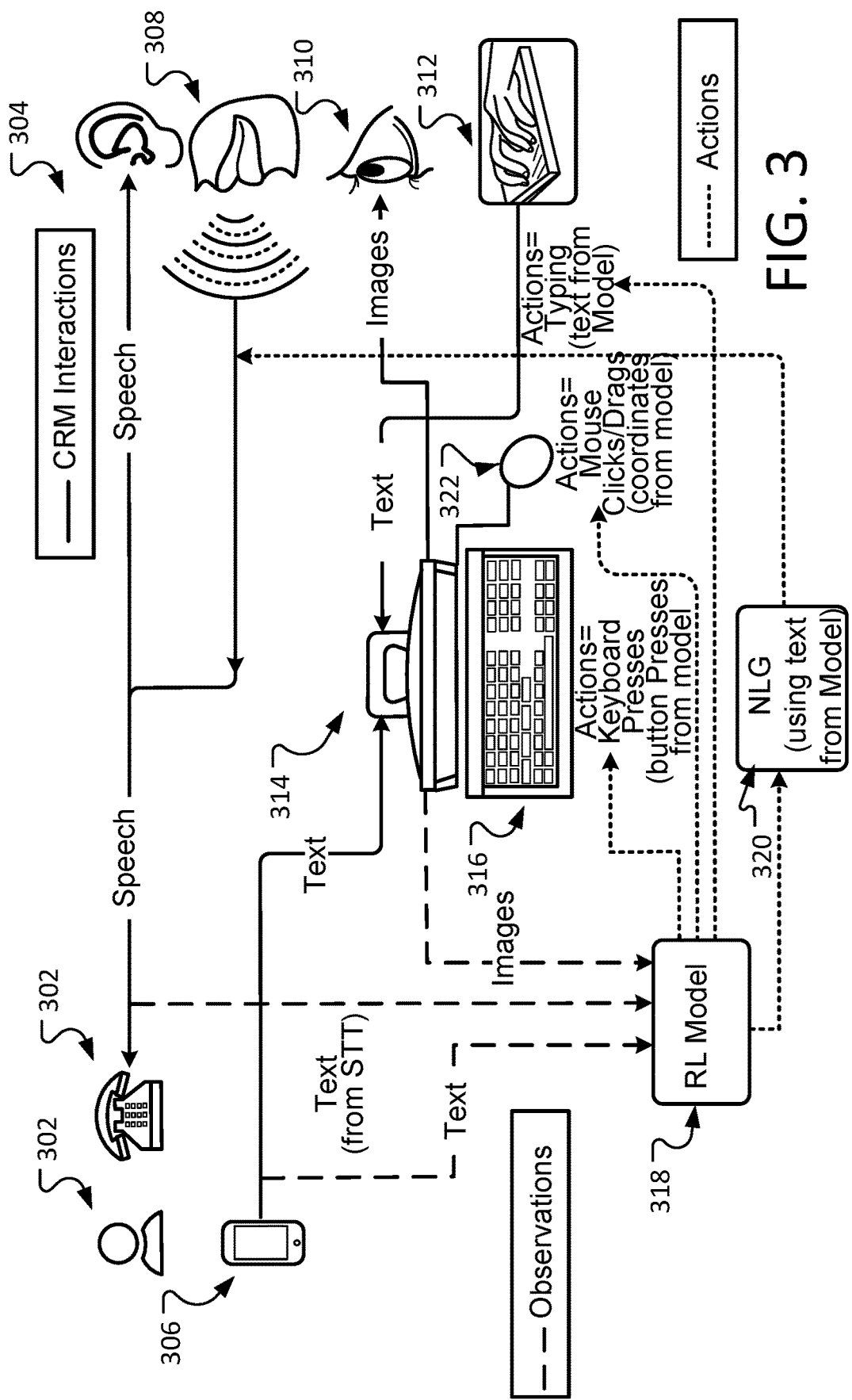
FIG. 3 depicts a flow diagram of an example process for providing model(s) for determining metric(s), according to implementations of the present disclosure.

FIG. 3 is a diagram that illustrates how reinforcement learning techniques can be applied in a customer service environment. In this figure the solid lines illustrate communication between the customer and a customer service representative. The customer 302 may interact 304 with a customer relationship representative using either voice communication over a communication channel, such as using a telephone 302 (or cellular telephone, skype, voice chat, video chat, in person interview, or any other mechanism that enables the customer to speak to a customer service representative). The customer service representative speaks 308 to the customer over the same communication channel. Alternatively, the customer 302 may communicate with the customer service representative using text messaging (or electronic chat, SMS messaging, or any other mechanism by which the customer may type or write communications that are received and answered by the customer service representative). The text message may be send to the computer system 314 of the customer service representative that coordinates the communication between the customer service representative (shown typing in reference number 312).

In response to communicating with the customer, the customer service representative may manipulate the computer to take one or more actions, for example, by using the keyboard 316 and the mouse 322.

The dashed lines illustrate communication between the customer and the reinforcement learning model 318. As with the communication between the customer and the customer service representative, the customer may be able to interact with the reinforcement learning model 318 using speech and/or text communication. The model 318 receives the text and communication and determines a course of action based on the mode 318. The model 318 may cause a computer system executing the model to perform actions such as pressing keyboard buttons 316, manipulating the mouse 322, and communicating with the customer. In scenarios, where the reinforcement learning model 318 is communicating with the customer using speech, a natural language generator 320 may generate speech based on text provided from the model 318.

Figure 4:
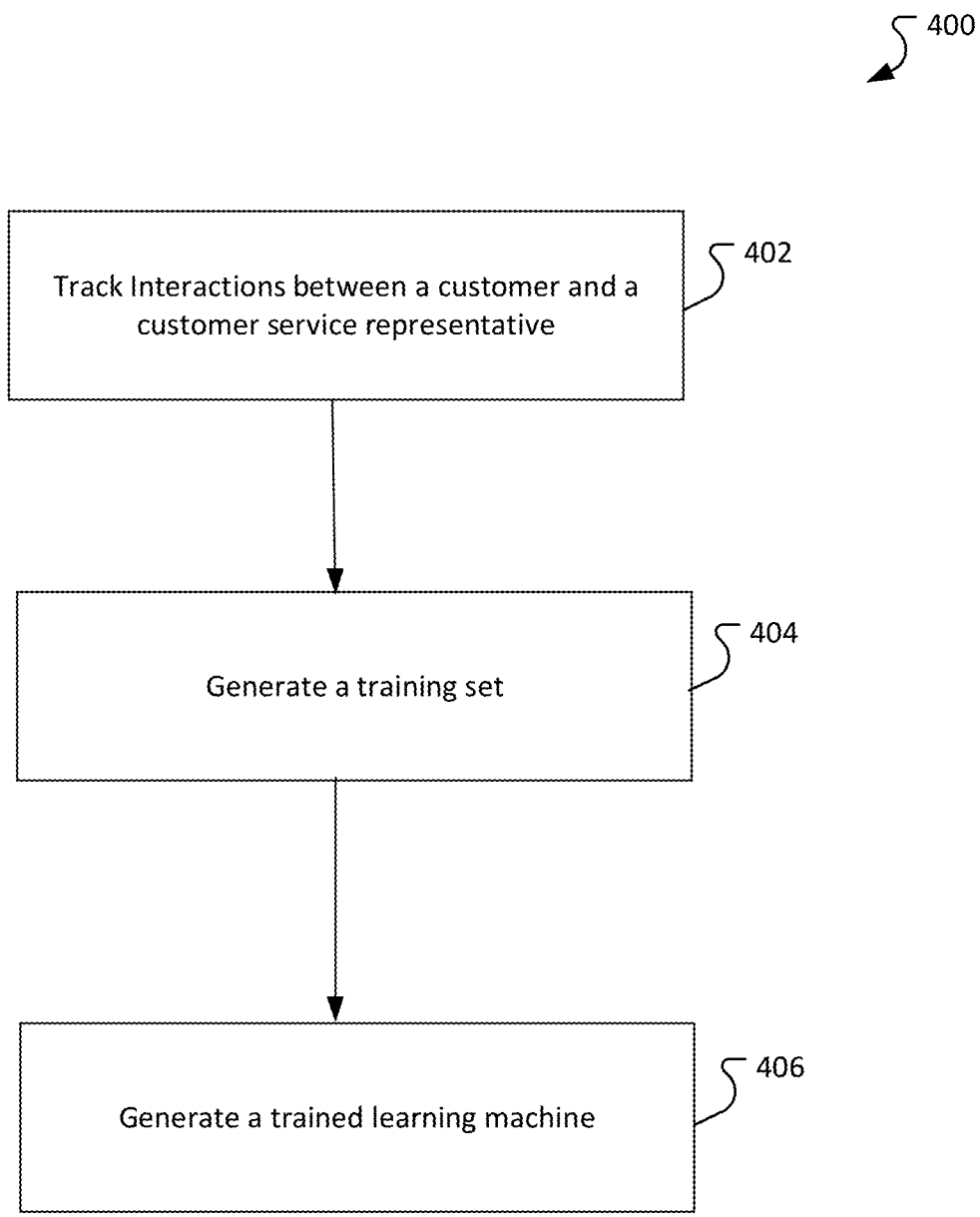
FIG. 4 depicts an example schematic of a system of two neural networks for determining metric(s), according to implementations of the present disclosure.

FIG. 4 is a flowchart of an example process 400 for training and using a learning machine. The process 400 tracks 402 interactions between a customer and a customer service representative. For example, as described above, the process 400 may log interactions between the customer and the customer service representative as well as actions taken by the customer service representative on a computer.

The process 400 generates 404 a training set. The process 400 generates 406 a trained learning machine.

Figure 5:
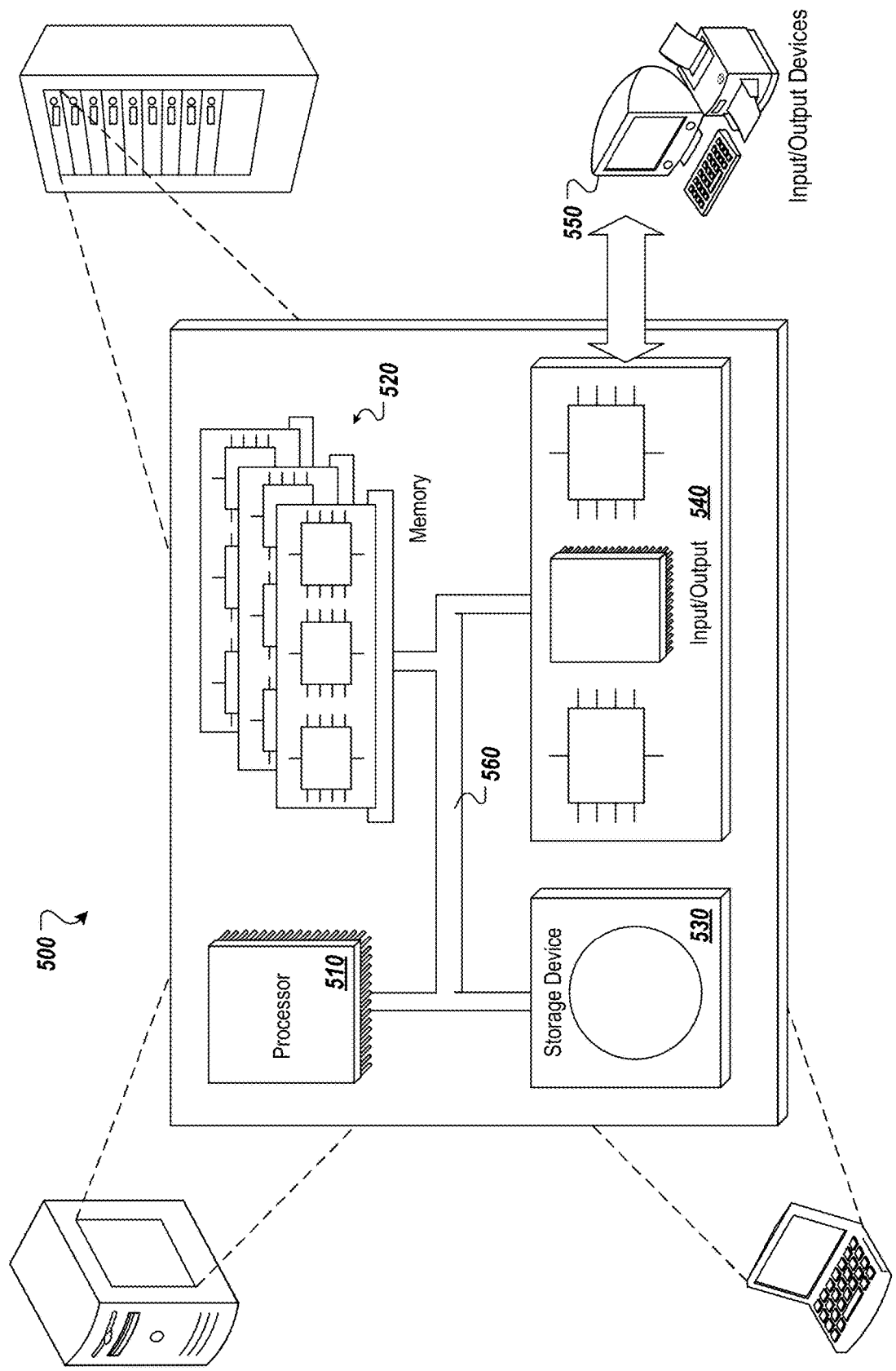
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the systems 114, and/or the system 116, and/or other computing device(s) or system(s) described herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
 tracking interactions between customers and customer service agents to obtain a set of tracked interactions;
 generating a training set based on the set of tracked interactions, wherein generating comprises, for each interaction:
  determining an emotional state of a respective one of the customer service agents during the interaction based on facial analysis of one or more images of the respective customer service agent, the one or more images obtained during the interaction,
  identifying an action taken by the respective customer service agent during the interaction based on computer monitoring data obtained from a computing device associated with the respective customer service agent, and
  generating a training sample for the interaction that includes the emotional state of the respective customer service agent and the action taken by the respective customer service agent; and generating a trained learning machine comprising training a learning machine by applying the training set to the learning machine.

2. The computer-implemented method of claim 1, further comprising establishing an interaction between a second customer and the trained learning machine.

3. The computer-implemented method of claim 1, wherein generating the training set further comprises, for each interaction, determining a quality indicia indicating a how well an action taken by the respective customer service involved in the interaction conforms to a standard.

4. The method of claim 3, wherein the quality indicia comprises information about whether an associated interaction was escalated or information about whether a customer of the associated interaction called back on the same topic or both.

5. The method of claim 1, wherein the computer monitoring data comprises one or more of application execution data, keystroke data, or mouse movement data.

6. The method of claim 1, wherein generating the training set based on the set of tracked interactions further comprises, for each interaction, determining an emotional state of a customer involved in the interaction based on auditory analysis of the interaction.

7. The method of claim 1, wherein determining the emotional state of the respective one of the customer service agents during the interaction comprises determining the emotional state of the respective one of the customer service agents based on both the facial analysis and auditory analysis of the customer service agent's speech during the interaction.

8. A system comprising:
at least one processor; and a data store coupled to the at least one processor having instructions stored thereon which, when executed by the at least one processor, causes the at least one processor to perform operations comprising:
tracking interactions between customers and customer service agents to obtain a set of tracked interactions;
generating a training set based on the set of tracked interactions, wherein generating comprises, for each interaction:
determining an emotional state of a respective one of the customer service agents during the interaction based on facial analysis of one or more images of the respective customer service agent, the one or more images obtained during the interaction,
identifying an action taken by the respective customer service agent during the interaction based on computer monitoring data obtained from a computing device associated with the respective customer service agent, and
generating a training sample for the interaction that includes the emotional state of the respective customer service agent and the action taken by the respective customer service agent; and
generating a trained learning machine comprising training a learning machine by applying the training set to the learning machine.

9. The system of claim 8, the operations further comprising establishing an interaction between a second customer and the trained learning machine.

10. The system claim 8, wherein generating the training set further comprises, for each interaction, determining a quality indicia indicating a how well an action taken by the respective customer service involved in the interaction conforms to a standard.

11. The system claim 10, wherein the quality indicia comprises information about whether an associated interaction was escalated or information about whether a customer of the associated interaction called back on the same topic or both.

12. The system of claim 8, wherein the computer monitoring data comprises one or more of application execution data, keystroke data, or mouse movement data.

13. The system of claim 8, wherein generating the training set based on the set of tracked interactions further comprises, for each interaction, determining an emotional state of a customer involved in the interaction based on auditory analysis of the interaction.

14. The system of claim 8, wherein determining the emotional state of the respective one of the customer service agents during the interaction comprises determining the emotional state of the respective one of the customer service agents based on both the facial analysis and auditory analysis of the customer service agent's speech during the interaction.

15. A non-transitory computer readable storage medium storing instructions that, when executed by at least one processor, cause the at least one processor to perform operations comprising:
tracking interactions between customers and customer service agents to obtain a set of tracked interactions;
generating a training set based on the set of tracked interactions, wherein generating comprises, for each interaction:
determining an emotional state of a respective one of the customer service agents during the interaction based on facial analysis of one or more images of the respective customer service agent, the one or more images obtained during the interaction,
identifying an action taken by the respective customer service agent during the interaction based on computer monitoring data obtained from a computing device associated with the respective customer service agent, and
generating a training sample for the interaction that includes the emotional state of the respective customer service agent and the action taken by the respective customer service agent; and
generating a trained learning machine comprising training a learning machine by applying the training set to the learning machine.

16. The medium of claim 15, the operations further comprising establishing an interaction between a second customer and the trained learning machine.

17. The medium claim 15, wherein generating the training set further comprises, for each interaction, determining a quality indicia indicating a how well an action taken by the respective customer service involved in the interaction conforms to a standard.

18. The medium claim 17, wherein the quality indicia comprises information about whether an associated interaction was escalated or information about whether a customer of the associated interaction called back on the same topic or both.

19. The medium of claim 15, wherein the computer monitoring data comprises one or more of application execution data, keystroke data, or mouse movement data.

20. The medium of claim 15, wherein generating the training set based on the set of tracked interactions further comprises, for each interaction, determining an emotional state of a customer involved in the interaction based on auditory analysis of the interaction.

\* \* \* \* \*